(12) United States Patent
Liu et al.

(10) Patent No.: US 9,231,646 B1
(45) Date of Patent: Jan. 5, 2016

(54) SINGLE SIGNAL TRANSMIT/RECEIVE MODULE AMPLIFIER SWITCHING CONTROL

(71) Applicant: M/A-COM Technology Solutions Holdings, Inc., Lowell, MA (US)

(72) Inventors: Chengxin Liu, Bedford, MA (US); Christopher D. Weigand, Andover, MA (US)

(73) Assignee: M/A-COM Technology Solutions Holdings, Inc., Lowell, MA (US)

( * ) Notice: Subject to any disclaimer, the term of this patent is extended or adjusted under 35 U.S.C. 154(b) by 40 days.

(21) Appl. No.: 14/338,750

(22) Filed: Jul. 23, 2014

(51) Int. Cl.
*H04B 1/46* (2006.01)
*H04B 1/44* (2006.01)
*H04B 1/48* (2006.01)

(52) U.S. Cl.
CPC ........................................ *H04B 1/48* (2013.01)

(58) Field of Classification Search
CPC ............. H04B 1/0475; H04B 7/15535; H04B 10/293; H03F 1/305
USPC .......... 455/63.1, 67.13, 78, 79, 82, 83, 84, 86
See application file for complete search history.

(56) References Cited

U.S. PATENT DOCUMENTS

| | | | | |
|---|---|---|---|---|
| 6,256,510 B1 * | 7/2001 | Muraoka | ............. | H04W 52/346 455/574 |
| 7,702,296 B2 * | 4/2010 | Siu | ........................... | H03F 1/223 455/78 |
| 7,865,149 B2 * | 1/2011 | Han | ........................ | H04B 1/48 455/78 |
| 8,417,286 B2 * | 4/2013 | Gorbachov | .......... | H04B 1/0064 455/78 |
| 2010/0197244 A1 * | 8/2010 | Gomez | ................. | H03F 1/0277 455/78 |

* cited by examiner

*Primary Examiner* — Quochien B Vuong
(74) *Attorney, Agent, or Firm* — Christopher P. Maiorana, PC

(57) ABSTRACT

A method for single signal transmit/receive module amplifier switching control is disclosed. Step (A) of the method may receive a control signal through a single pin of a circuit. The control signal may alternately conveys (i) a receive mode and (ii) a transmit mode. Step (B) may generate a transmit signal in a disabled state in response to the control signal transitioning from the transmit mode to the receive mode. The transmit signal in the disabled state is generally configured to disable a transmit amplifier. Step (C) may generate a receive signal in an enabled state a receive delay time after the control signal transitions from the transmit mode to the receive mode. The receive signal in the enabled state is generally configured to enable a receive amplifier. The receive delay time may allow the transmit amplifier to switch off before the receive amplifier switches on.

18 Claims, 7 Drawing Sheets

… …

SINGLE SIGNAL TRANSMIT/RECEIVE MODULE AMPLIFIER SWITCHING CONTROL

FIELD OF THE INVENTION

The present invention relates to transmit/receive modules generally and, more particularly, to a method and/or apparatus for implementing a single signal transmit/receive module amplifier switching control.

BACKGROUND OF THE INVENTION

Conventional transmit/receive modules have separate controls for switching circuitry, receive amplifier circuitry, and transmit amplifier circuitry. A risk of oscillation exists if transitions of a low noise amplifier enable/disable signal and a power amplifier enable/disable signal are not timed correctly. In some situations, the oscillation could be destructive. Furthermore, the multiple separate control lines increase a size of the dice within the transmit/receive module and consume more external circuitry.

It would be desirable to implement a single signal transmit/receive module amplifier switching control.

SUMMARY OF THE INVENTION

The present invention concerns a method for single signal transmit/receive module amplifier switching control. Step (A) of the method may receive a control signal through a single pin of a circuit. The control signal may alternately convey (i) a receive mode and (ii) a transmit mode. Step (B) may generate a transmit signal in a disabled state in response to the control signal transitioning from the transmit mode to the receive mode. The transmit signal in the disabled state is generally configured to disable a transmit amplifier. Step (C) may generate a receive signal in an enabled state a receive delay time after the control signal transitions from the transmit mode to the receive mode. The receive signal in the enabled state is generally configured to enable a receive amplifier. The receive delay time may allow the transmit amplifier to switch off before the receive amplifier switches on.

The objects, features and advantages of the present invention include providing a single signal transmit/receive module amplifier switching control that may (i) switch off a power amplifier before switching on a low noise amplifier, (ii) switch off the low noise amplifier before switching on the power amplifier, (iii) control both amplifiers using a single control signal, (iv) generate a switch signal to control transmitter switching, (v) generate another switch signal to control receiver switching and/or (vi) be implemented as a hardware-only circuit.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Various embodiments of the invention may use a single control signal into a transmit/receive module, and internal circuitry on a die, to control a transmit switch, a receive switch, a receive amplifier enable/disable, and a transmit amplifier enable/disable. The internal circuitry generally ensures that the transmit amplifier is switched off (or disabled) before switching on (or enabling) the receive amplifier when changing from a transmit mode to a receive mode. The internal circuitry may also ensure that the receive amplifier is switched off (or disabled) before switching on (or enabling) the transmit amplifier when changing from the receive mode to the transmit mode. Avoiding times while both the transmit amplifier and the receive amplifier are switched on generally prevents potential oscillations, which could damage one or both of the amplifiers, lead to out-of-band spurious noise, and/or cause an excessive current draw.

The internal circuitry generally has buffers (e.g., inverters) that separate the various signals for driving the switches, the receive amplifier, and the transmit amplifier. Separate complementary controls may be generated to control the switches. Delay circuits may be added to enable/disable a low noise amplifier in a receiver and enable/disable a power amplifier in a transmitter with different delays for switching on and switching off. The delays may be short for switching off and longer for switching on. A transmit delay time generally ensures that the receive amplifier will be switched off before the transmit amplifier being switched on. A receive delay time may also ensure that the transmit amplifier is switched off before the receive amplifier is switched on. The delays generally create an idle mode (or state) where the transmit/receive module has both the transmit amplifier and the receive amplifier switched off (disabled) at the same time (simultaneously).

Figure 1:
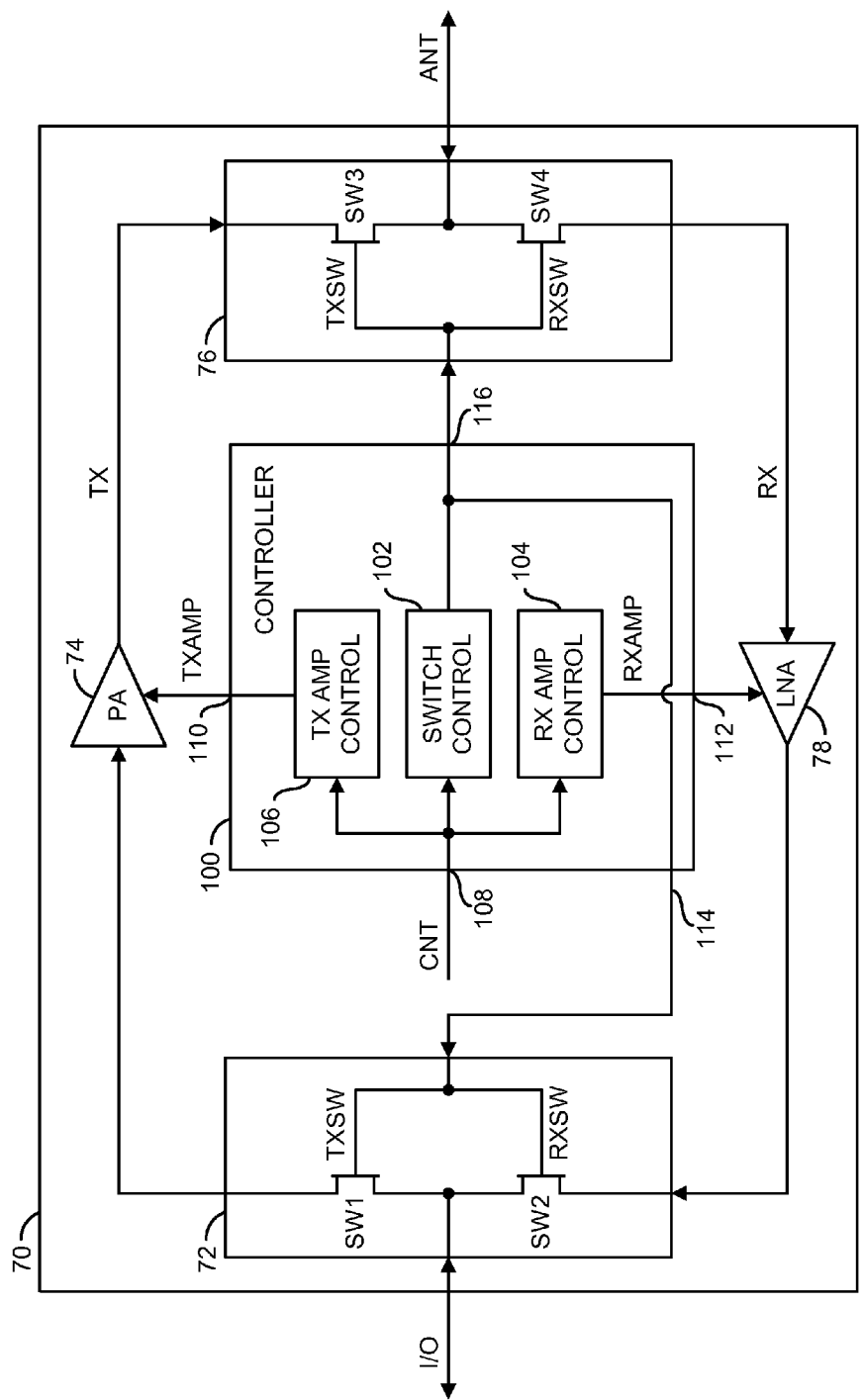
FIG. 1 is a block diagram of a system in accordance with a preferred embodiment of the present invention.

Referring to FIG. 1, a block diagram of a system 70 is shown in accordance with a preferred embodiment of the present invention. The system (or apparatus or circuit or integrated circuit) 70 may implement a transmit/receive module. The system 70 generally comprises a block (or circuit) 72, a block (or circuit) 74, a block (or circuit) 76, a block (or circuit) 78, and a block (or circuit) 100. The circuit 100 generally comprises a block (or circuit) 102, a block (or circuit) 104, and a block (or circuit) 106. The circuits 72 to 106 may be implemented in hardware, software executing on hardware, and/or simulated with software.

A bidirectional signal (e.g., I/O) may be sent/received by the circuit 72. The input/output signal I/O generally conveys data to be transmitted while acting as an input signal in a transmit mode. The signal I/O may convey data that has been received while acting as an output signal in a receive mode. The signal I/O may couple the system 70 to external circuitry that generates the transmit data and consumes the receive data. A bidirectional signal (e.g., ANT) may be sent/received by the circuit 76. The signal ANT generally couples the system 70 to an antenna. The antenna signal ANT generally carries the transmit data while acting as an output signal in the transmit mode. The signal ANT may carry the receive data while acting as an input signal in the receive mode. A signal (e.g., CNT) may be received by all of the circuits 102, 104 and 106 through a port (or pin or interface) 108 of the circuit 100 (and/or the circuit 70). The signal CNT may act as a control signal that governs the enablement and disablement of amplifier circuitry in the circuits 74 and 78.

A signal (e.g., TX) may be generated by the circuit 74 and presented to the circuit 76. The signal TX generally conveys the data to be transmitted on the antenna. A signal (e.g., RX) may be received by the circuit 76 and transferred to the circuit 78. The signal RX generally carries the data received though the signal ANT as transferred through the circuit 76.

A signal (e.g., RXSW) may be generated by the circuit 102 and presented through a port 114 to the circuit 72 and through a port 116 to the circuit 76. The receive switch signal RXSW may be a switch control signal used to control switching by the circuits 72 and 76. A signal (e.g., TXSW) may be generated by the circuit 102 and presented through the port 114 to the circuit 72 and through the port 116 to the circuit 76. The transmit switch signal TXSW may be another switch control signal used to control switching by the circuits 72 and 76.

A signal (e.g., RXAMP) may be generated by the circuit 104 and presented through a port 112 to the circuit 78. The signal RXAMP may be a receive amplifier control signal used alternatively to enable and disable the circuit 78 from amplifying data in the signal RX. A signal (e.g., TXAMP) may be generated by the circuit 106 and presented through a port 110 to the circuit 74. The signal TXAMP may be a transmit amplifier control signal used alternatively to enable and disable the circuit 74 from transmitting power through the signal TX.

The circuit 72 may be implemented as a switch circuit. The circuit 72 is generally operational to switch the signal I/O between the circuit 78 in the receive mode and the circuit 74 in the transmit mode. The circuit 72 generally comprises multiple switches (e.g., SW1 and SW2). Control of the switch SW1 may be provided by the signal TXSW. Control of the switch SW2 may be provided by the signal RXSW.

The circuit 74 may implement an amplifier circuit. In various embodiments, the circuit 74 implements a power amplifier. The circuit 74 is generally operational to amplify the signal I/O as received from the circuit 72 to increase the transmit power. The amplified transmit signal may be presented in the signal TX and applied to the antenna via the circuit 76. Enablement/disablement of the circuit 74 is generally controlled by the signal TXAMP.

The circuit 76 may implement another switch circuit. The circuit 76 is generally operational to switch (i) the signal TX to the signal ANT in the transmit mode and (ii) the signal ANT to the signal RX in the receive mode. The circuit 76 generally comprises multiple switches (e.g., SW3 and SW4). Control of the switch SW3 may be provided by the signal TXSW. Control of the switch SW4 may be provided by the signal RXSW.

The circuit 78 may implement an amplifier circuit. In various embodiments, the circuit 78 implements a low noise amplifier. The circuit 78 is generally operational to amplify the signal RX as received from the antenna via the circuit 76. The amplification is generally designed to work on low power signals and to introduce a low amount of noise during the amplification. Enablement/disablement of the circuit 78 is generally controlled by the signal RXAMP.

The circuit 100 may implement a controller circuit. The circuit 100 is generally operational to receive the control signal CNT though a single pin (e.g., 108). The control signal alternately conveys two modes (e.g., transmit mode and receive mode). The circuit 100 may also be operational to generate an output signal in a disabled state in response to the control signal transitioning in a given direction between modes. The output signal in the disabled state may be configured to disable an amplifier in the circuit 70 (e.g., the circuit 74). The circuit 100 may be further configured to generate another output signal in an enabled state a delay time after the control signal transitions in the given direction. The other output signal in the enabled state may be configured to enable another amplifier in the circuit (e.g., the circuit 78). The delay time generally allows the amplifier to switch off before the other amplifier switches on.

When the control signal transitions between modes opposite the given direction, the circuit 100 may be operational to enable the amplifier and disable the other amplifier. Another delay time generally allows the other amplifier in to switch off before the amplifier switches on. The modes may be the receive mode and the transmit mode. In various embodiments, the circuit 100 may be implemented as a hardware-only circuit.

The circuit 102 may implement a switch control circuit. The circuit 102 is generally operational to generate the signals RXSW and TXSW based on the transitions and/or mode of the signal CNT. When the signal CNT transitions from the receive mode to the transmit mode and/or is in the transmit mode, the circuit 102 may drive the signals RXSW and TXSW to cause the circuit 72 to direct the signal I/O to the circuit 74, and cause the circuit 76 to direct the signal TX to the signal ANT. When the signal CNT transitions from the transmit mode to the receive mode and/or is in the receive mode, the circuit 102 may drive the signals RXSW and TXSW to cause the circuit 72 to receive the signal I/O from the circuit 78, and cause the circuit 76 to direct the signal ANT to the signal RX.

The circuit 104 may implement a receive amplifier control circuit. The circuit 104 is generally operational to generate the signal RXAMP to control the circuit 78. Generation of the signal RXAMP is based on the mode and transitions of the signal CNT.

The circuit 106 may implement a transmit amplifier control circuit. The circuit 106 is generally operational to generate the signal TXAMP to control the circuit 74. Generation of the signal TXAMP is based on the mode and transitions of the signal CNT.

Figure 2:
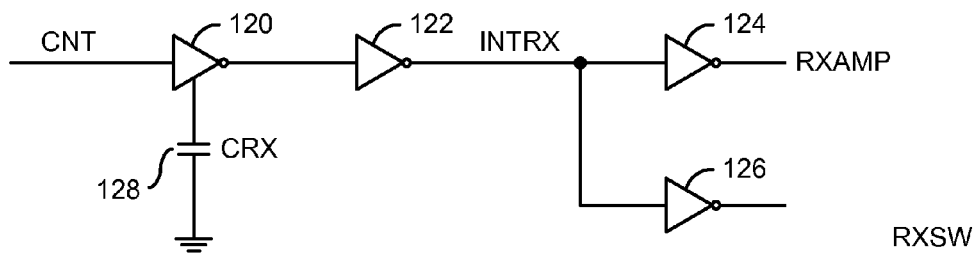
FIG. 2 is a block diagram of a switch/receive control circuit.

Referring to FIG. 2, a block diagram of an example implementation of the circuit 104 and portion of the circuit 102 is shown. The circuit 102/104 generally comprises a block (or circuit) 120, a block (or circuit) 122, a block (or circuit) 124, a block (or circuit) 126, and a block (or circuit) 128. The circuits 120 to 128 may be implemented in hardware, software executing on hardware, and/or simulated with software.

The signal CNT may be received by the circuit 120. The signal RXAMP may be generated and presented from the circuit 124. The signal RXSW may be generated and presented from the circuit 126. A signal (e.g., INTRX) may be generated by the circuit 122 and transferred to the circuits 124 and 126. The signal INTRX may implement an intermediate receive signal used to control the generation of the signals RXAMP and RXSW.

The circuit 120 may implement an inverter circuit. The circuit 120 is generally operational to delay rising edges and falling edges in the signal CNT. The delay may be controlled by a capacitance (e.g., CRX) of the circuit 128. The delayed signal CNT may be presented to the circuit 122.

The circuit 122 may implement an inverter circuit. The circuit 122 is generally operational to invert the delayed signal CNT such that the rising edges and falling edges in the signal INTRX match the polarity in the original signal CNT.

The circuit 124 may implement an inverter circuit. The circuit 124 is generally operational to generate the signal RXAMP. The signal. RXAMP may be created by amplifying and inverting the signal INTRX.

The circuit 126 may implement an inverter circuit. The circuit 126 is generally operational to generate the signal RXSW. The signal RXSW may be created by amplifying and inverting the signal INTRX.

The circuit 128 may implement a capacitor circuit. The circuit 128 is generally operational to create the delay through the circuit 120 such that the rising edges and the falling edges in the signal INTRX lag behind the rising/falling edges in the signal CNT. In some embodiments, the circuit 128 may have a capacitance value of 4 picofarad. Other capacitive values may be implemented to meet the criteria of a particular application.

In some embodiments, the circuits 120 and 122 may be common to the generation of the signal RXAMP and the signal RXSW. Therefore, the signal INTRX may be generated by one of the circuits 102 or 104 and transferred to the other circuit. In other embodiments, the circuits 120 and 122 may be instantiated in both the circuits 102 and 104. Therefore, the circuits 120, 122 and 126 may be within the circuit 102 and the circuits 120, 122 and 124 may be within the circuit 104.

Figure 3:
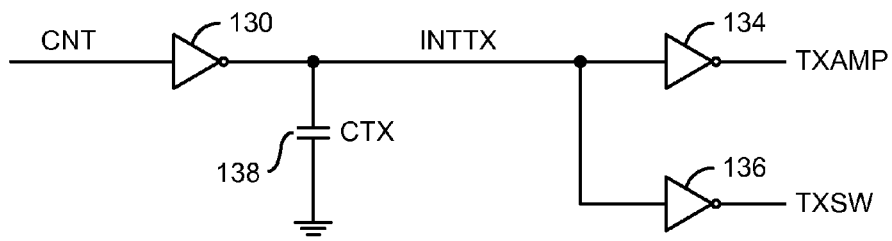
FIG. 3 is a block diagram of a switch/transmit control circuit.

Referring to FIG. 3, a block diagram of an example implementation of the circuit 106 and a portion of the circuit 102 is shown. The circuit 102/106 generally comprises a block (or circuit) 130, a block (or circuit) 134, a block (or circuit) 136, and a block (or circuit) 138. The circuits 130 to 138 may be implemented in hardware, software executing on hardware, and/or simulated with software.

The signal CNT may be received by the circuit 130. The signal TXAMP may be generated and presented from the circuit 134. The signal TXSW may be generated and presented from the circuit 136. A signal (e.g., INTTX) may be generated by the circuit 130 and transferred to the circuits 134 and 136. The signal INTTX may implement an intermediate transmit signal used to control the generation of the signals TXAMP and TXSW.

The circuit 130 may implement an inverter circuit. The circuit 130 is generally operational to invert the signal CNT to generate the signal INTTX. The signal INTTX may drive a capacitive load (e.g., CTX) of the circuit 138. The capacitive load may delay the rising edges and the falling edges of the signal INTTX relative to the signal CNT. A length of the delay is generally established by a capacitance value of the circuit 138.

The circuit 134 may implement an inverter circuit. The circuit 134 is generally operational to generate the signal TXAMP. The signal TXAMP may be created by amplifying and inverting the signal INTTX. Since the circuit 106 has fewer invertors between the signal CNT and the signal TXAMP than the circuit 104 has between the signal CNT and the signal RXAMP, the signals RXAMP and TXAMP may have opposite polarities. While the signal TXAMP is in a logical high state, the signal RXAMP may be in a logical low state. While the signal TXAMP is in the logical low state, the signal RXAMP is generally in the logical high state after an initial delay.

The circuit 136 may implement an inverter circuit. The circuit 136 is generally operational to generate the signal TXSW. The signal TXSW may be created by amplifying and inverting the signal INTTX. Since the circuit 106 has fewer invertors between the signal CNT and the signal TXSW than the circuit 104 has between the signal CNT and the signal RXSW, the signals RXSW and TXSW may have opposite polarities. While the signal TXSW is in the logical high state, the signal RXSW may be in a logical low state. While the signal TXSW is in the logical low state, the signal RXSW is generally in the logical high state after an initial delay.

The circuit 138 may implement a capacitor circuit. The circuit 138 is generally operational to create the delay in the signal INTTX such that the rising edges and the falling edges in the signal INTRX lag behind the rising/falling edges in the signal CNT. In some embodiments, the circuit 138 may have a capacitance value of 8 picofarad. Other capacitive values may be implemented to meet the criteria of a particular application.

In some embodiments, the circuit 130 may be common to the generation of the signal TXAMP and the signal TXSW. Therefore, the signal INTTX may be generated by one of the circuits 102 or 106 and transferred to the other circuit. In other embodiments, the circuit 130 may be instantiated in both the circuits 102 and 106. Therefore, the circuits 130 and 136 may be within the circuit 102 and the circuits 130 and 134 may be within the circuit 106.

Figure 4:
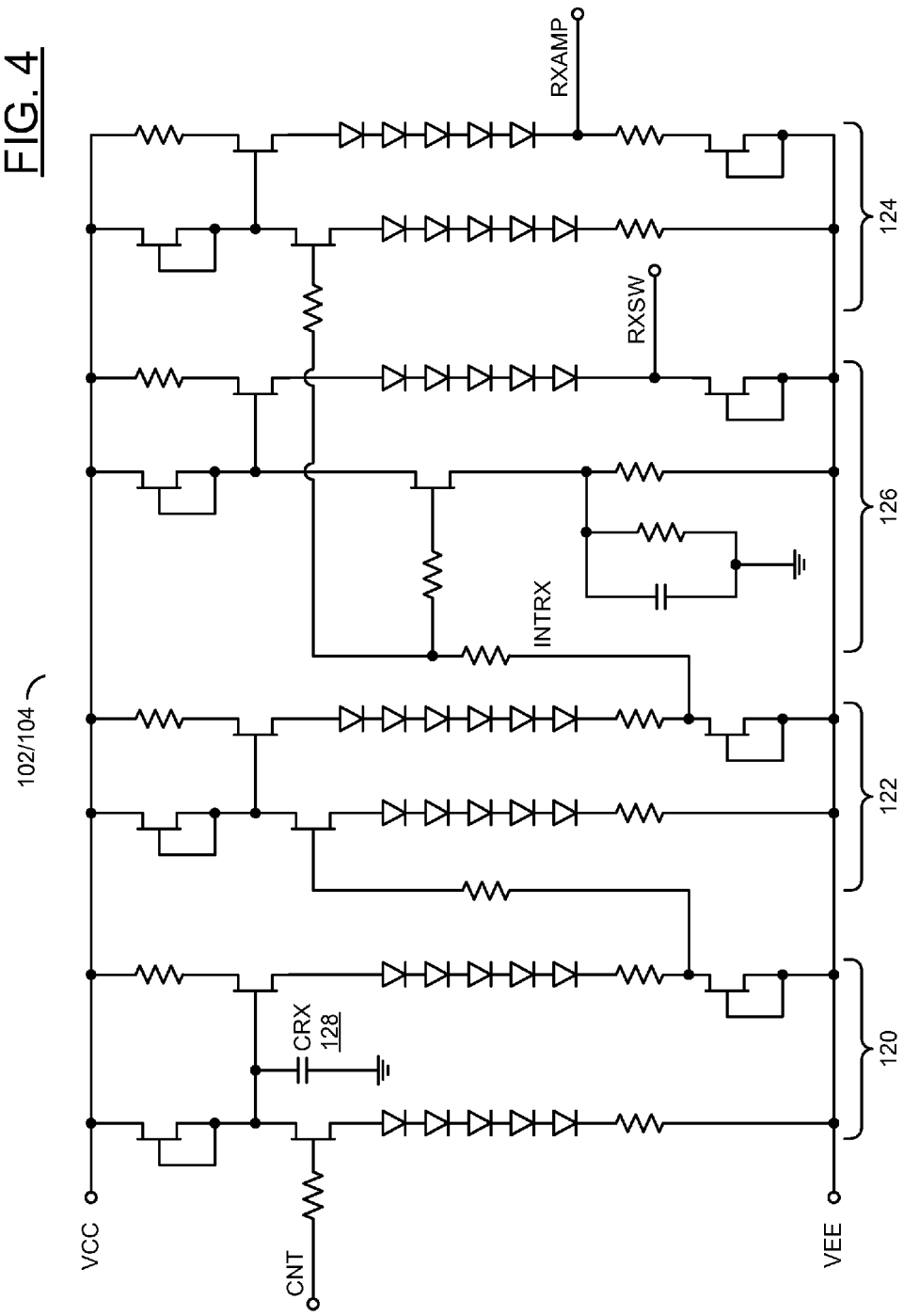
FIG. 4 is a schematic of the switch/receive control circuit.

Referring to FIG. 4, a schematic of an example implementation of the circuit 102/104 is shown. The circuit 102/104 generally comprises multiple columns of circuitry. Each column may include one or more transistors, one or more resistors, and multiple diodes. Adjacent pairs of columns may form the circuits 120-126. In various embodiments, the transistors may be implemented as field effect transistors. In some embodiments, the transistors are generally implemented as depletion mode transistors. The transistors may be fabricated as GaAs logic. Other transistor technologies and numbers of transistors may be implemented to meet the criteria of a particular application. The diodes in the columns may implement fixed voltage drops used to shift switching point voltage levels of the corresponding transistors in each respective column. Other numbers (e.g., more or fewer) of columns, transistors in each column, diodes in each column, and resistors within the columns and between the columns may be implemented to meet the criteria of a particular application.

The circuit 120 may be designed as an inverter (e.g., the leftmost column) connected to a source follower (e.g., the second leftmost column). The capacitor 128 (e.g., CRX) may be connected to a gate of the transistor in the second column.

The circuit 122 may be designed as an inverter (e.g., the third leftmost column) connected to a source follower (e.g., the fourth leftmost column). The fourth column may be configured to generate the signal INTRX.

The circuit 126 may be designed as an inverter (e.g., the fifth leftmost column) connected to a source follower (e.g., the sixth leftmost column). Circuitry connected to the source of the transistor in the fifth column may implement a voltage divider. The voltage divider generally sets the switching threshold for the signal RXSW output buffer. The source follower and the diodes may set the voltage swing from a negative voltage (e.g., approximately −8 volts) to a positive voltage (e.g., +1 volts). Other voltage swings may be implemented to meet the criteria of a particular application.

The circuit 124 may be designed as an inverter (the seventh leftmost column) connected to a source follower (e.g., the rightmost column). The rightmost column may generate the signal RXAMP. In various embodiments, a voltage swing of the signal RXAMP may range from a negative voltage (e.g., approximately −4 volts) to a positive voltage (e.g., +2 volts). Other voltage swings may be implemented to meet the criteria of a particular application.

Figure 5:
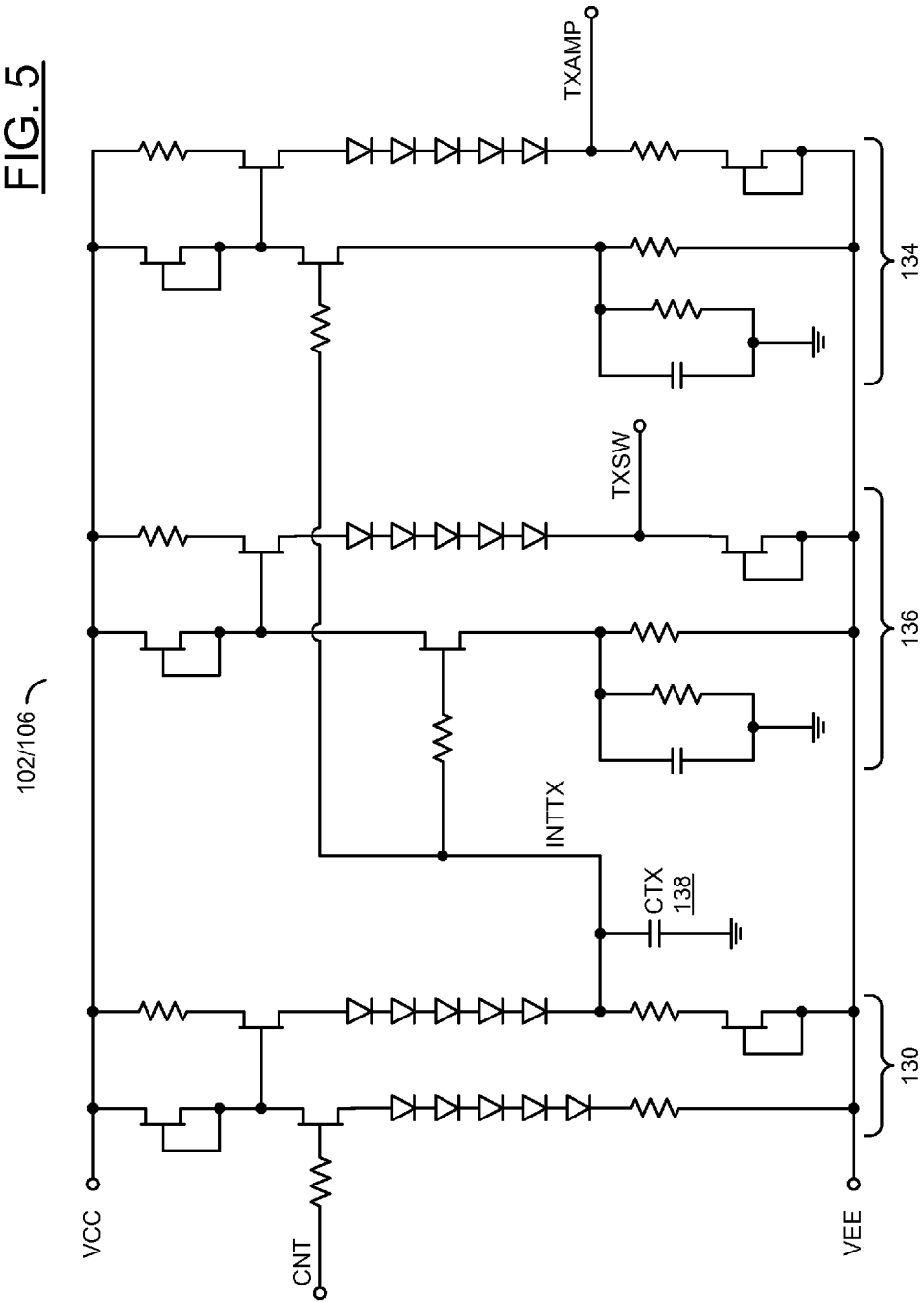
FIG. 5 is a schematic of the switch/transmit control circuit.

Referring to FIG. 5, a schematic of an example implementation of the circuit 102/106 is shown. The circuit 102/106 generally comprises multiple columns of circuitry. Each column may include one or more transistors, one or more resistors, and multiple diodes. Adjacent pairs of columns may form the circuits 130-136. In various embodiments, the transistors may be implemented as field effect transistors. In some embodiments, the transistors are generally implemented as depletion mode transistors. The transistors may be fabricated as GaAs logic. Other transistor technologies and numbers of transistors may be implemented to meet the criteria of a particular application. The diodes in the columns may implement fixed voltage drops used to shift switching point voltage levels in each respective column. Other numbers (e.g., more or fewer) of columns, transistors in each column, diodes in each column, and resistors within the columns and between the columns may be implemented to meet the criteria of a particular application.

The circuit 130 may be designed as an inverter (e.g., the leftmost column) connected to a source follower (e.g., the second leftmost column). The capacitor 138 (e.g., CTX) may be driven by the second column. The second column may create the signal INTTX.

The circuit 136 may be designed as an inverter (e.g., the third leftmost column) connected to a source follower (e.g., the fourth leftmost column). Circuitry connected to the source of the transistor in the third column may implement a voltage divider. The voltage divider sets the switching threshold of the circuit 130. The source follower and the diode chain generally set the voltage swing of the signal TXSW from a negative voltage (e.g., approximately −8 volts) to a positive voltage (e.g., +1 volts). Other voltage swings may be implemented to meet the criteria of a particular application.

The circuit 134 may be designed as an inverter (the fifth leftmost column) connected to a source follower (e.g., the rightmost column). Circuitry connected to the source of the transistor in the fifth column may implement a voltage divider. The voltage divider generally sets the switching threshold for the signal TXAMP output buffer. The source follower and the diodes may set the voltage swing from a negative voltage (e.g., approximately −2 volts) to a positive voltage (e.g., +2 volts). Other voltage swings may be implemented to meet the criteria of a particular application.

Operations of the circuit 100 have been simulated to verify that the power amplifier circuit 74 and the low noise amplifier circuit 78 are not switched on at the same time. The simulation is generally based on the following target specification. The signal CNT is a single control signal received at a single pin (or port) 108. The signal ANT may convey an 18 decibel referenced to a milliwatt (e.g., dBm) transmit output power signal with a 28 dBm output peak power. No compression should be experienced at the 28 dBm output peak power. A frequency range of the signal ANT is 14 gigahertz (e.g., GHz) minimum to 14.5 GHz maximum. A gain is approximately 30 dB minimum to 33 dB maximum.

The signal CNT may be a logical zero (0) at −3.0 volts to −2.1 volts relative to a ground. The signal CNT may be a logical one (1) at −0.2 volts to 0 volts relative to ground. A switching time of the signal CNT is generally 20 nanoseconds maximum. A positive power supply (e.g., Vcc) may range from 5.7 volts to 6.3 volts relative to ground. A negative power supply (e.g., Vee) may range from −9.45 volts to −8.55 volts relative to ground.

Figure 6:
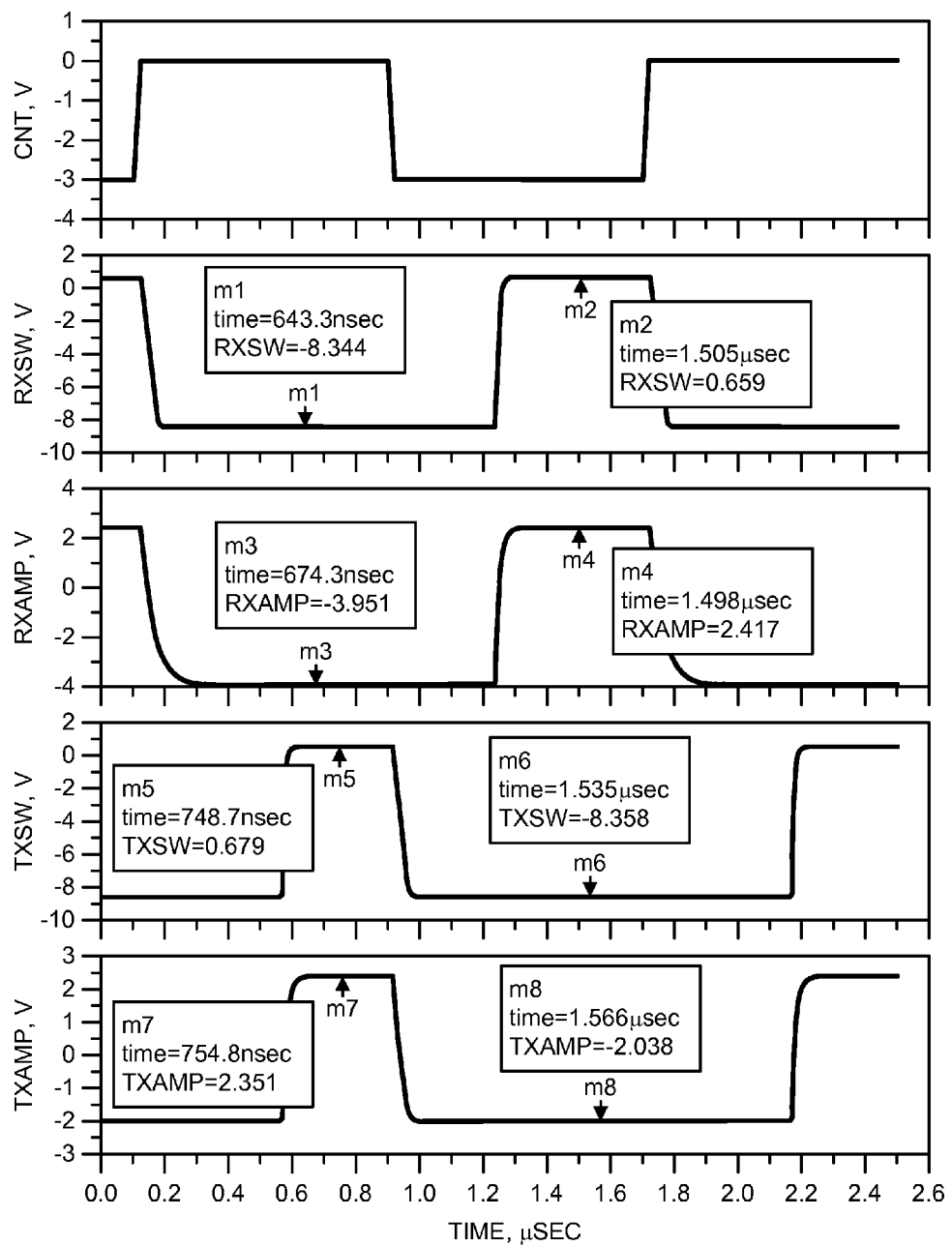
FIG. 6 is a graph of simulated waveforms.

Referring to FIG. 6, a graph of simulated waveforms for the signals generated by the circuit 100 is shown. The signals may include CNT, RXSW, RXAMP, TXSW and TXAMP. An input threshold for the logic high and the logic low may be −1.5 volts at 25 degrees Celsius. A logical high on the signal CNT may enable the transmit path (e.g., the transmit mode). A logical low on the signal CNT may enable the receive path (e.g., the receive mode). For a transition from the transmit mode to the receive mode, a switching speed from the time that the control signal CNT is received until the power amplifier circuit 74 is switched off may be approximately 100 nanoseconds (e.g., ns). The switching speed from the time that the control signal CNT is received until the low noise amplifier circuit 78 is switched on may be approximately 550 ns.

As shown by the curves, the power amplifier circuit 74 may be switched on after the low noise amplifier circuit 78 is switched off. An idle mode (or period) is generally created (e.g., between approximately 0.2 and 0.55 microseconds (μsec)) in which both the power amplifier circuit 74 and the low noise amplifier circuit 78 are both switched off. Likewise, the low noise amplifier circuit 78 is switched on after the power amplifier circuit 74 is switched off. Another idle mode (or period) may be created (e.g., between approximately 0.95 to 1.25 microseconds) in which both the power amplifier circuit 74 and the low noise amplifier circuit 78 are both switched off.

The rise times and the fall times of the signals RXSW and RXAMP may be similar times. The rise times of the signal TXSW and TXAMP may be similar times. In some embodiments, the fall time of the signal RXAMP may be longer than the fall time of the signal RXSW.

Figure 7:
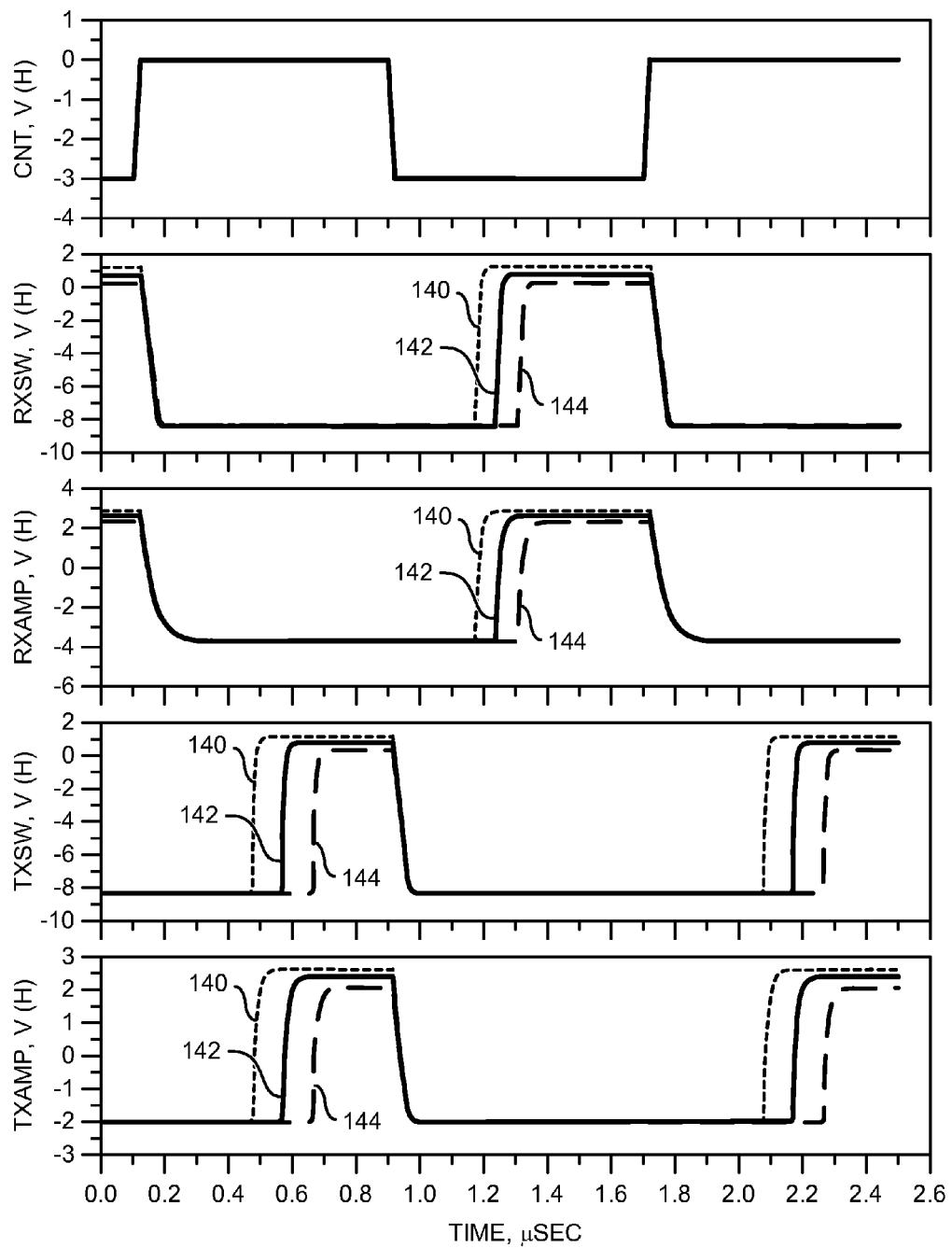
FIG. 7 is a graph of the simulated waveforms as a function of temperature.

Referring to FIG. 7, a graph of the simulated waveforms as a function of temperature is shown. The curves 140 generally represent the temperature at 85 degrees Celsius. The curves 142 may represent the temperature at 25 degrees Celsius. The curves 144 generally represent the temperature at −55 degrees Celsius. Each diode is generally modeled as having a higher drop at −55 degrees Celsius and a lower voltage drop at 85 degrees Celsius compared to the voltage drop at 25 degrees Celsius. The resistors generally have a common sensitivity to temperature.

Figure 8:
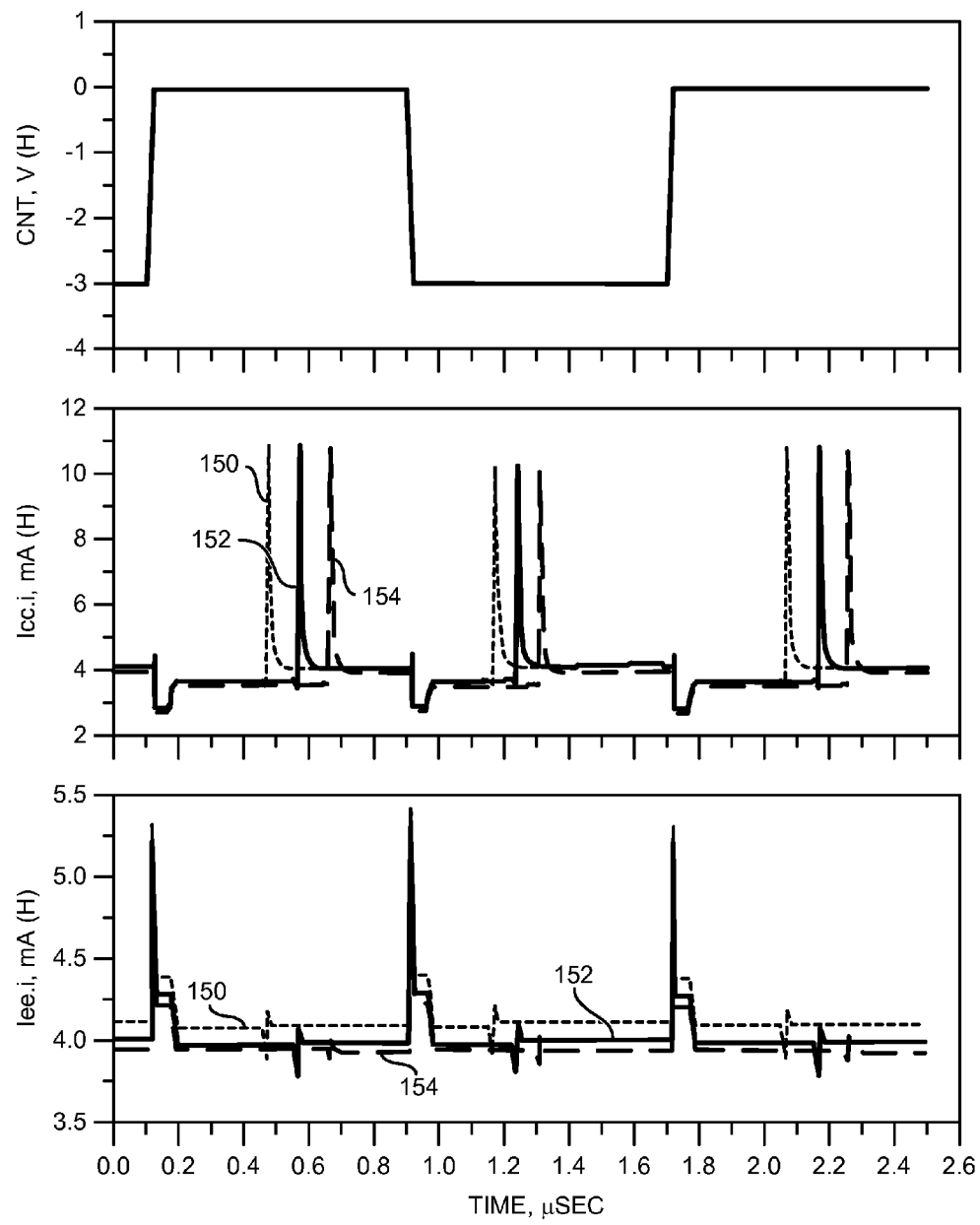
FIG. 8 is a graph of a current draw as a function of temperature.

Referring to FIG. 8, a graph of a current draw of the circuit 100 as a function of temperature is shown. The curves 150 generally represent the temperature at 85 degrees Celsius. The curves 152 may represent the temperature at 25 degrees Celsius. The curves 154 generally represent the temperature at −55 degrees Celsius. A peak current draw on the positive power rail (e.g., Vcc) is less than 11 milliamperes. A peak current draw on the negative power rail (e.g., Vee) is less than 6 milliamperes.

The functions and structures illustrated in the diagrams of FIGS. 1-5 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for single signal transmit/receive module amplifier switching control, comprising the steps of:
    (A) receiving a control signal through a single pin of a circuit, wherein said control signal alternately conveys (i) a receive mode and (ii) a transmit mode;
    (B) generating a transmit signal in a disabled state in response to said control signal transitioning from said transmit mode to said receive mode, wherein said transmit signal in said disabled state is configured to disable a transmit amplifier; and
    (C) generating a receive signal in an enabled state a receive delay time after said control signal transitions from said transmit mode to said receive mode, wherein (i) said receive signal in said enabled state is configured to enable a receive amplifier, and (ii) said receive delay time allows said transmit amplifier to switch off before said receive amplifier switches on.

2. The method according to claim 1, wherein (i) said method is implemented in said transmit/receive module, (ii) said transmit amplifier comprises a power amplifier, and (iii) said receive amplifier comprises a low noise amplifier.

3. The method according to claim 1, further comprising the step of:
    generating said receive signal in said disabled state in response to said control signal transitioning from said receive mode to said transmit mode, wherein said receive signal in said disabled state is configured to disable said receive amplifier.

4. The method according to claim 3, further comprising the step of:
    generating said transmit signal in said enabled state a transmit delay time after said control signal transitions from said receive mode to said transmit mode, wherein (i) said transmit signal in said enabled state is configured to enable said transmit amplifier, and (ii) said transmit delay time allows said receive amplifier to switch off before said transmit amplifier switches on.

5. The method according to claim 4, wherein said receive delay time is different than said transmit delay time.

6. The method according to claim 1, wherein said receive signal has different voltage levels than said transmit signal.

7. The method according to claim 1, further comprising the step of:
    generating a switch signal in parallel to generating said transmit signal, wherein (i) said switch signal is configured to control a plurality of switches and (ii) said switch signal has different voltage levels than said transmit signal.

8. The method according to claim 1, further comprising the step of:
    generating a switch signal in parallel to generating said receive signal, wherein (i) said switch signal is configured to control a plurality of switches and (ii) said switch signal has different voltage levels than said receive signal.

9. The method according to claim 8, wherein said receive signal transitions from said enabled state to said disabled state slower than said switch signal.

10. The method according to claim 8, wherein said switch signal and said receive signal transition from said disabled state to said enabled state in a similar time.

11. A method for single signal transmit/receive module amplifier switching control, comprising the steps of:
    (A) receiving a control signal through a single pin of a circuit, wherein said control signal alternately conveys (i) a receive mode and (ii) a transmit mode;
    (B) generating a receive signal in a disabled state in response to said control signal transitioning from said receive mode to said transmit mode, wherein said receive signal in said disabled state is configured to disable a receive amplifier; and
    (C) generating a transmit signal in an enabled state a transmit delay time after said control signal transitions from said receive mode to said transmit mode, wherein (i) said transmit signal in said enabled state is configured to enable a transmit amplifier and (ii) said transmit delay time allows said receive amplifier to switch off before said transmit amplifier switches on.

12. The method according to claim 11, wherein (i) said transmit delay time is different than a receive delay time, and (ii) said receive delay time is used after said control signal transitions from said transmit mode to said receive mode.

13. The method according to claim 11, wherein said receive signal has different voltage levels than said transmit signal.

14. The method according to claim 11, further comprising the step of:
    generating a first switch signal in parallel to generating said transmit signal, wherein (i) said first switch signal is configured to control a plurality of first switches and (ii) said first switch signal has different voltage levels than said transmit signal; and
    generating a second switch signal in parallel to generating said receive signal, wherein (i) said second switch signal is configured to control a plurality of second switches and (ii) said second switch signal has different voltage levels than said receive signal.

15. An apparatus comprising:
    a single pin configured to receive a control signal, wherein said control signal alternately conveys (i) a first mode and (ii) a second mode; and
    a circuit configured to (i) generate a first signal in a disabled state in response to said control signal transitioning from said second mode to said first mode, wherein said first signal in said disabled state is configured to disable a first amplifier, and (ii) generate a second signal in an enabled state a delay time after said control signal transitions from said second mode to said first mode, wherein (a) said second signal in said enabled state is configured to enable a second amplifier, and (b) said delay time allows said first amplifier to switch off before said second amplifier switches on.

16. The apparatus according to claim 15, wherein (i) said delay time is different than another delay time, and (ii) said another delay time is used after said control signal transitions from said first mode to said second mode.

17. The apparatus according to claim 15, wherein said first signal has different voltage levels than said second signal.

18. The apparatus according to claim 15, wherein (i) said first amplifier comprises a power amplifier, and (ii) said second amplifier comprises a low noise amplifier.

* * * * *